United States Patent [19]

Brill et al.

[11] 4,024,546

[45] May 17, 1977

[54] METAL-COATED CARRIER FOR RECORDINGS AND PROCESS FOR DETERMINING THE OXYGEN-ATTACHED ALUMINUM CONTENTS IN THE COATING

[75] Inventors: Klaus Brill, Korntal; Eberhard Traub, Stuttgart; Alfred Ortlieb, Stuttgart; Wolfgang Grothe, Stuttgart; Friedrich Scholl, Stuttgart, all of Germany

[73] Assignee: Robert Bosch GmbH, Stuttgart, Germany

[22] Filed: Mar. 2, 1972

[21] Appl. No.: 231,342

[30] Foreign Application Priority Data

Mar. 9, 1971 Germany .......................... 2111274

[52] U.S. Cl. ................................ 346/135; 428/336; 428/457; 428/464; 428/498; 428/539

[51] Int. Cl.² .................... G01D 15/34; B32B 15/04

[58] Field of Search ............... 117/227, 106 R, 107, 117/106 A; 346/135, 76 R; 428/336, 457, 498, 539

[56] References Cited

UNITED STATES PATENTS

| | | | |
|---|---|---|---|
| 2,808,345 | 10/1957 | Traub | 346/135 |
| 2,833,677 | 5/1958 | Baumlein | 346/135 |
| 3,349,408 | 10/1967 | Gillen | 346/135 |
| 3,560,994 | 2/1971 | Wolff | 346/135 |
| 3,657,721 | 4/1972 | Traub | 117/201 |
| 3,754,901 | 8/1973 | Hull | 117/227 |
| 3,758,336 | 9/1973 | Reichle | 117/227 |

*Primary Examiner*—Michael F. Esposito
*Attorney, Agent, or Firm*—Michael J. Striker

[57] ABSTRACT

A carrier medium for recording comprises a ribbon of insulating material and a metal coating deposited thereon in a thickness of at least 250 A which coating is adapted to be electrically seared for producing writing trackings. The coating is predominantly composed of vapor deposited aluminum of which at least 15% by weight is in the form of aluminum oxide, aluminum oxide hydrate or a combination of these two compounds.

The content of oxygen-attached aluminum in the metallic coating is determined by first measuring the total aluminum contents per surface unit in a definite size specimen of the coating, then placing the specimen into alkali to evolve hydrogen in an amount equivalent to the metallic aluminum present in the coating, whereupon the amount of hydrogen developed is determined by gas chromatography.

12 Claims, 3 Drawing Figures

METAL-COATED CARRIER FOR RECORDINGS AND PROCESS FOR DETERMINING THE OXYGEN-ATTACHED ALUMINUM CONTENTS IN THE COATING

BACKGROUND OF THE INVENTION

The invention relates to a carrier or medium for recordings for recording apparatus. The metal coating of a recording carrier is usually held as thin as possible because of the high current density which is used in the recording operation in order to melt and evaporate parts of the coating surface. If the coating is of a small thickness the energy necessary to cause the evaporation can be reduced and thus a relatively high recording speed may be obtained. The lower limit for the thickness of the metal coating is determined by the fact that the coating must be opaque in order to obtain a clear discernibility of the formed trackings and in order also to have a sufficient electric conductivity for discharging and feeding in the necessary current. In prior art recording mediums these requirements are met by a thickness of the metal coating of at least 250 A which coating is usually applied by evaporation from the vapor phase in a vacuum onto a ribbon of insulating material. In metal paper for recording purposes (RPM) the metal coating usually consists of nickel or of a zinc cadmium alloy. Record trackings on nickel RMP are however not always clearly discernible because of too small a contrast. On the other hand, metal coatings of zinc-cadmium have an insufficient chemical resistance.

Coatings made of aluminum have been found superior to the earlier metal coatings because of the high specific electric conductivity, the high optical reflective power and the high chemical resistance of aluminum. On the other hand, when aluminum-RMP is used difficulties arise because of the formation of an oxide layer on the surface of the aluminum coating. The oxide coating, on the one hand, forms a protective layer and thus increases the chemical resistance of the coating. On the other hand, it has a low electric conductivity and the recording electrode must therefore be impressed on the metal coating with a force of at least 200 mp or a recording voltage must be used of more than 40 Volt in order to obtain a sufficient contact between the recording electrode and the metal coating to result in clearly visible record trackings. It has also been found that aluminum coatings under poor storage conditions have a tendency to corrode.

The invention therefore has the object to provide for a recording medium with an aluminum coating which is applied to a ribbon of insulating material in which a higher corrosion resistance is obtained and in which the undesirable effects of a continuous outer oxide surface are avoided.

SUMMARY OF THE INVENTION

This object is accomplished by providing a ribbon of insulating material with a vapor deposited aluminum coating of a thickness of at least 250 A wherein the coating contains at least 15% by weight of aluminum oxide and/or aluminum oxide hydrate.

The invention also embraces a process for determining the contents of oxygen-attached aluminum in the metallic coating. This is done by first measuring by X-ray fluorescence analytical methods the total aluminum contents per surface unit in a definite size specimen of coating. The specimen is then placed into alkali to evolve hydrogen in an amount equivalent to the metallic aluminum present in the coating. The amount of evolved hydrogen is then determined by gas chromatography.

The novel features which are considered as characteristic for the invention are set forth in particular in the appended claims. The invention itself however, both as to its construction and its method of operation, together with additional objects and advantages thereof will be best understood from the following description of specific embodiments when read in connection with the accompanying drawings.

DESCRIPTION OF THE PREFERRED EMBODIMENTS

The surprising point of the invention is that because of the embodiment of aluminum oxide ($Al_2O_3$) and aluminum oxide hydrate ($AlO(OH)$) more distinct trackings are obtained than with the prior art recording mediums in spite of the reduced conductivity of the metal coating.

Principally this is due to the fact that the protective outer coating formed on the aluminum coat is substantially more sensitized because of the added materials. Corrosion tests have also shown a substantially higher corrosion resistance of the metal coating of the invention as compared with the prior art aluminum RMP.

The contents of the minimum amount (limit value) of oxygen-attached aluminum ($Al_2O_3$ and $AlO(OH)$) in the coating cannot be directly measured. It was therefore necessary to devise a process by which the weight fraction of oxygen-attached aluminum relative to the total vapor-applied amount of aluminum could be determined as exactly as possible.

To accomplish this determination the following process is used: the total aluminum contents is first measured by x-ray fluorescent analytic methods as applying to each surface unit of a coating of a specific size. The coating is then placed into alkali and the amount of hydrogen which is thus generated is measured in a gas chromatograph. The amount of hydrogen is equivalent to the metallic aluminum contents in the coating. The measurement of the amount of hydrogen is effected separately from other residual gases which may be present using a heat conductivity detector. In this manner, it is possible to determine which amount of aluminum per unit of area is dissolved in the alkali. The contents of oxygen-attached aluminum can then be determined from the difference of the two previously established values.

By means of this measuring process it is possible to control the build-up during vapor application of the coating to the insulating ribbon so as to maintain the necessary amounts and limits.

The invention will be further explained with reference to the attached drawings.

Figure 1:
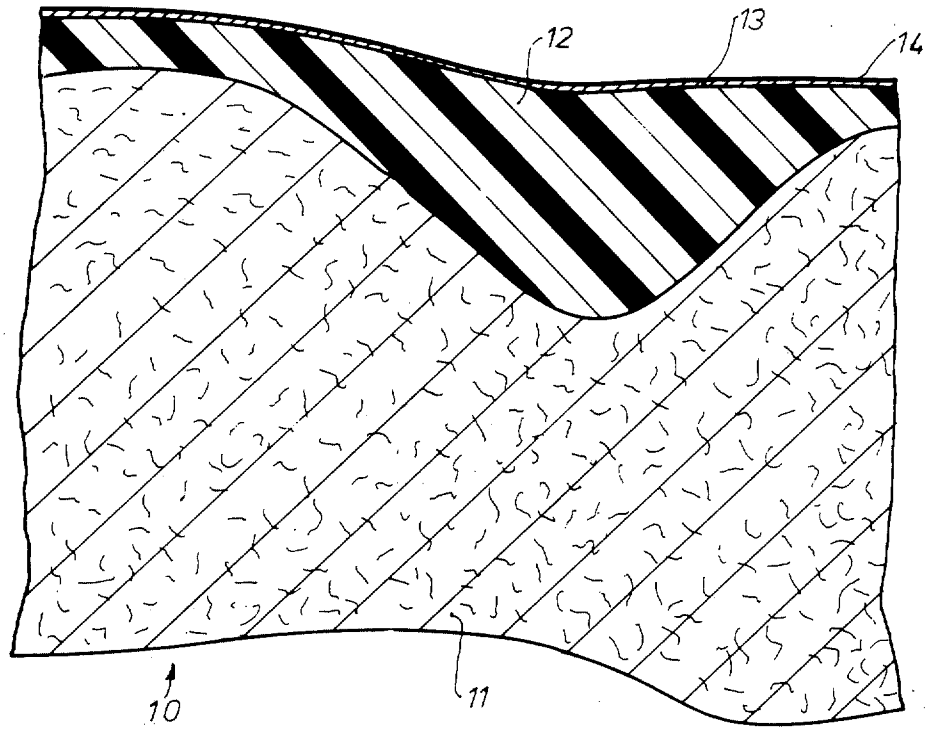
FIG. 1 is a greatly enlarged cross-section through the recording carrier which is provided with the metal coating of the invention.

Referring in the first place to FIG. 1, it will be seen that 10 indicates a highly enlarged cross-section of the recording medium or carrier. This carrier consists of a paper ribbon 11 which may have a thickness of about 40 microns. The paper ribbon is covered at its surface with a lacquer coating 12 of a thickness of 1.5 $\mu m$ which is colored to form a sufficient contrast. The lacquer coating 12 is provided with an outer coating 13 of a thickness of 550 A made of aluminum with additions of aluminum oxides and aluminum oxide hydrate. The coating 13 is applied to the paper ribbon 11 in a vacuum in the presence of water vapor. The vapor-applied aluminum coating contains altogether about 17% by weight of aluminum in the form of aluminum oxide and aluminum oxide hydrate.

By incorporating the oxide and the oxide hydrate a structure is obtained in the coating which makes the oxide outer surface 14 considerably more sensitive towards mechanical and electrical stress by the recording electrode (not shown) than could be obtained with aluminum coatings which have a continuous oxidized outer surface.

With the carrier and medium of the invention it is possible to obtain a steady contact between the recording electrode and the coating 13 at an application pressure of the recording electrode which is reduced to 50 mp and at a recording voltage which is reduced down to 5 V. Thus, clearly visible record trackings can be obtained.

The recording carrier of the invention in addition has a substantially higher corrosion resistance. At a temperature of 20° C and a relative air humidity of 95% no corrosion phenomena could be discerned afer 2 weeks. The same type of recording carrier provided with a pure aluminum coating showed under the same conditions and after the same length of time distinct corrosion resulting in an increase of the coating resistance or pitting (hole formation) which made the carrier unsuitable for further recordings.

Depending on conditions it may be desirable to apply by vapor application other metals together with the aluminum. The desirable properties obtained by the incorporation of aluminum oxide or aluminum oxide hydrate are still retained. According to this embodiment it is however preferred that the vapor applied coating contains at least 80% by weight of total aluminum.

It was for instance found that with a metal coating containing up to 1% by weight of cobalt or up to 2% by weight of silicon pulverulent combustion residues are formed during searing of the metal coating which do not form deposits on the recording electrode.

A further improvement of the recording properties in form of reduction of the recording voltage or increase of the recording speed could be obtained with a metal coat which contained up to 9% germanium. The same could be accomplished with corresponding addition of copper. With a metal coat containing up to 10% chromium a further increase of the corrosion resistance was obtained. A higher corrosion resistance and better recording properties can also be obtained with a metal coating containing up to 4% by weight of nickel.

Figure 2:
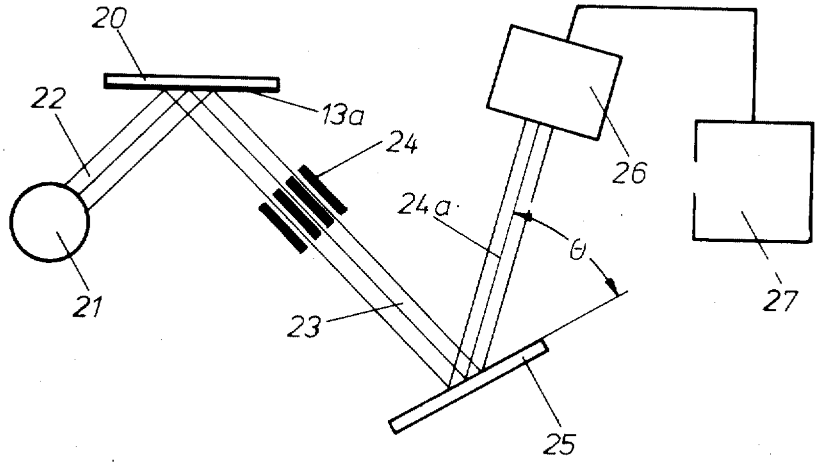
FIG. 2 illustrates in diagrammatic form a measuring arrangement to determine the total aluminum contents in the coating.

Now turning to the process for determining the amount of metallic aluminum in the coating 13 resort is had in the first place to the conventional X-ray fluorescence analysis methods (RFA). An arrangement to carry out this operation is shown in FIG. 2. A specimen 20 of the recording carrier previously described having a diameter of 30 mm was exposed to an X-ray radiation 22 emanating from an X-ray tube 21. The radiation 22 produced a fluorescent radiation 23 in the specimen 20 which through several apertured diaphragms 24 was directed toward an analyser crystal 25. The analyser crystal caused the spectral separation of the fluorescent rays 24 in such manner that the radiation which emanated from a specific metal of the coating 13*a* was reflected on the crystal 25 under a specific angle 0. The thus reflected fluorescent rays 24*a* were received in a preset counter tube 26 and converted to voltage impulses. The impulse frequency thus was made proportional to the intensity of the rays 24*a* while the intensity in turn was proportional to the amount of aluminum in the coating 13*a*. After a definite period of time the reading was effected of the total impulse number during that period of time by means of the counter 27. By means of a predetermined standard line which indicated the aluminum weight per unit of area depending on the number of impulses it was thus possible to measure the aluminum weight per area unit of the coating 13*a* by determining the total impulse number. In the specific example this aluminum weight was found to be 15.0 $\mu g/cm^2$.

Figure 3:
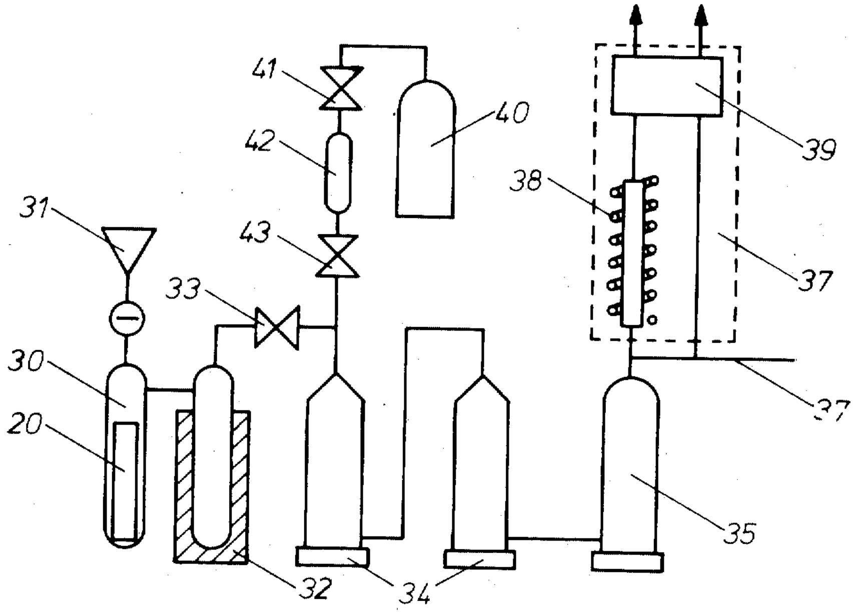
FIG. 3 shows an arrangement to determine the aluminum contents in the coating which is present in metallic form.

FIG. 3 further illustrates an arrangement to determine the aluminum contents which is present in metallic form in a specimen 20 which was used also in FIG. 2. The specimen 20 for this purpose is rolled up and placed in a reaction vessel 30. The vessel is then evacuated and subsequently sodium hydroxide is added from a dropping funnel 31 until the specimen is completely covered. The strong alkali causes the metallic aluminum to dissolve out of the coating 13*a* following the equation:

$$Al + 3H_2O + 3OH^- \rightarrow (Al(OH)_6)^{3-} + 1.5\ H_2$$

The thus generated amount of hydrogen is equivalent to the dissolved amount of aluminum. The hydrogen is now passed through a cooling trap 32 and is then further passed, after opening of a valve 33 of two successive mercury diffusion pumps 34, into a Topler pump 35 and is there collected. This pump expels the hydrogen in predetermined time intervals into a stream 36 of a carrier gas by which the hydrogen is passed into the gas chromatograph 37. By permeating through a molecular sieve column 38 the hydrogen is separated of any other residual gases which may be present.

By means of a heat conduction detector 39 the value is finally determined which is proportional to the amount of hydrogen. This value is then compared with the value which is obtained with an amount of a standard gas received from a storage vessel 40 and passed via a valve 41 into a standard vessel 42 which has a predetermined volume capacity. The thus defined amount of standard gas corresponds to a specific amount of aluminum. The gas is likewise passed into the current 36 of the carrier gas through a valve 43 while valve 33 is closed and via the diffusion pumps 34 and the Topler pump 35.

The amount of aluminum present as metallic aluminum in the specimen can thus be determined with great accuracy from the value obtained from the heat conduction detector 39 and based on the value of the amount of hydrogen generated in the reaction vessel 30. In the specific instance, the value relative to the unit of surface was 12.4 $\mu g/cm^2$.

If we now deduct the metallic aluminum fraction of 12.4 $\mu g/cm^2$ from the total amount of aluminum of 15.0 $\mu g/cm^2$ there remains a balance of 2.6 $\mu g/cm^2$ of aluminum in the form of aluminum oxide and/or aluminum oxide-hydrate which is present in the coating 13*a*. If this is related to the total aluminum contents in the coating it is found that 17.3% by weight of aluminum are attached to oxygen.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

We claim:

1. A carrier for recordings, particularly for recordings produced by selectively burning away portions of the carrier, comprising a ribbon of insulating material; and a layer for the production of recordings provided on said ribbon and having a minimum thickness of about 250 angstroms, said layer including a minimum of about 15 percent by weight of aluminum in the form of a substance selected from the group consisting of aluminum oxide, aluminum oxide hydrate and mixtures of aluminum oxide and aluminum oxide hydrate, and said layer further including at least one element selected from the group consisting of cobalt, silicon, germanium, chromium and nickel, the remainder of said layer being predominanty metallic aluminum, and the total aluminum content of said layer being a minimum of about 80 percent by weight.

2. The carrier of claim 1 wherein said layer contains up to about 1% by weight of cobalt.

3. The carrier of claim 1 wherein said layer contains up to about 2% by weight of silicon.

4. The carrier of claim 1 wherein said layer contains up to about 9% by weight of germanium.

5. The carrier of claim 1 wherein said layer contains up to about 10% by weight of chromium.

6. The carrier of claim 1 wherein said layer contains up to about 4% by weight of nickel.

7. The carrier of claim 1 wherein said layer comprises up to about 1 percent by weight of cobalt, up to about 2 percent by weight of silicon, up to about 9 percent by weight of germanium, up to about 10 percent by weight of chromium and up to about 4 percent by weight of nickel.

8. The carrier of claim 1, wherein said layer consists essentially of said substance, said metallic aluminum and at least one of the elements selected from the group consisting of chromium and nickel.

9. The carrier of claim 8, wherein said layer comprises up to about 10 percent by weight of chromium and up to about 4 percent by weight of nickel.

10. The carrier of claim 1, wherein said layer consists essentially of said substance, said metallic aluminum and at least one of the elements selected from the group consisting of cobalt, silicon and germanium.

11. The carrier of claim 10, wherein said layer comprises up to about 1 percent by weight of cobalt, up to about 2 percent by weight of silicon and up to about 9 percent by weight of germanium.

12. The carrier of claim 1, wherein said insulating material comprises paper; and further comprising a layer of lacquer arranged intermediate said ribbon and said layer.

* * * * *